United States Patent [19]

Cartry et al.

[11] Patent Number: 4,976,027
[45] Date of Patent: Dec. 11, 1990

[54] DEVICE FOR LINING A PERIPHERAL TUBE OF A STEAM GENERATOR

[75] Inventors: Jean P. Cartry; Bruno Fraissenet, both of Lyons, France

[73] Assignee: Framatome, Courbevoie, France

[21] Appl. No.: 276,846

[22] Filed: Nov. 28, 1988

Related U.S. Application Data

[62] Division of Ser. No. 44,255, Apr. 30, 1987, Pat. No. 4,827,594.

[30] Foreign Application Priority Data

Apr. 30, 1986 [FR] France .................................. 86 06344

[51] Int. Cl.$^5$ ............................................. B23P 15/26
[52] U.S. Cl. ......................................... 29/727; 29/723; 29/890.051
[58] Field of Search ............... 29/727, 726, 723, 157.4, 29/157.3 R, 157.3 C, 523, 235

[56] References Cited

U.S. PATENT DOCUMENTS

| | | |
|---|---|---|
| 4,262,402 | 4/1981 | Cooper, Jr. et al. ................. 29/727 |
| 4,329,769 | 5/1982 | Glatthorn ............................. 29/727 |
| 4,571,821 | 2/1986 | Pirl et al. ............................. 29/723 |
| 4,639,994 | 2/1987 | Cooper, Jr. et al. ................. 29/727 |
| 4,688,327 | 8/1987 | Cooper, Jr. et al. ................. 29/726 |
| 4,716,753 | 1/1988 | Martin ................................. 29/727 |
| 4,793,044 | 12/1988 | Cartry et al. ....................... 29/157.4 |
| 4,829,648 | 5/1989 | Arzenti et al. ..................... 29/157.4 |

Primary Examiner—Carl E. Hall
Assistant Examiner—Irene Cuda
Attorney, Agent, or Firm—Pollock, Vande Sande & Priddy

[57] ABSTRACT

A curved structure (20) with two flat side flanges and a curved bottom (23') connecting the flanges, each of which is associated with a curved guiding slide (24a,24-b) is used for lining a peripheral tube of a steam generator. A trolley (21) having wheels (25, 26) interacting with the guiding slides moves in the curved structure and is guided along the inner wall of the water box of the steam generator. A rigid roller-expanding tool (24) is connected to a drive mechanism carried by the trolley by a flexible cable, and is guided by a guiding device after it leaves the curved structure.

6 Claims, 12 Drawing Sheets

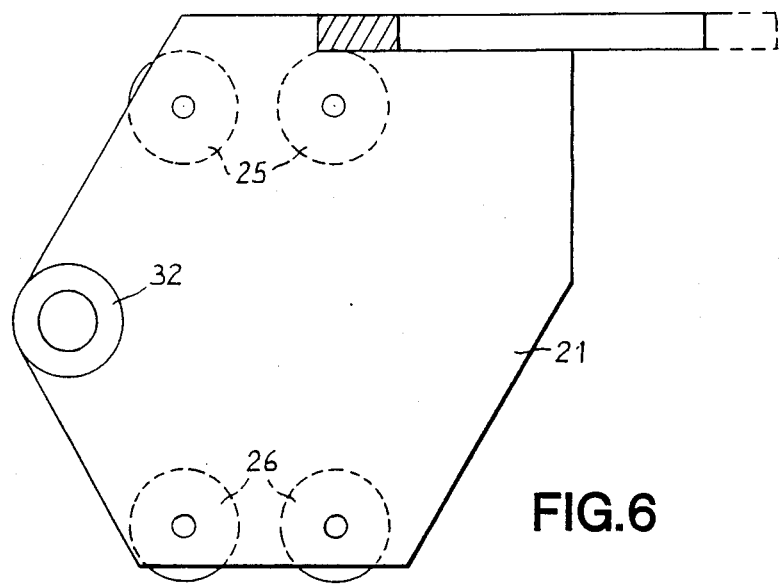
FIG.6
FIG.7
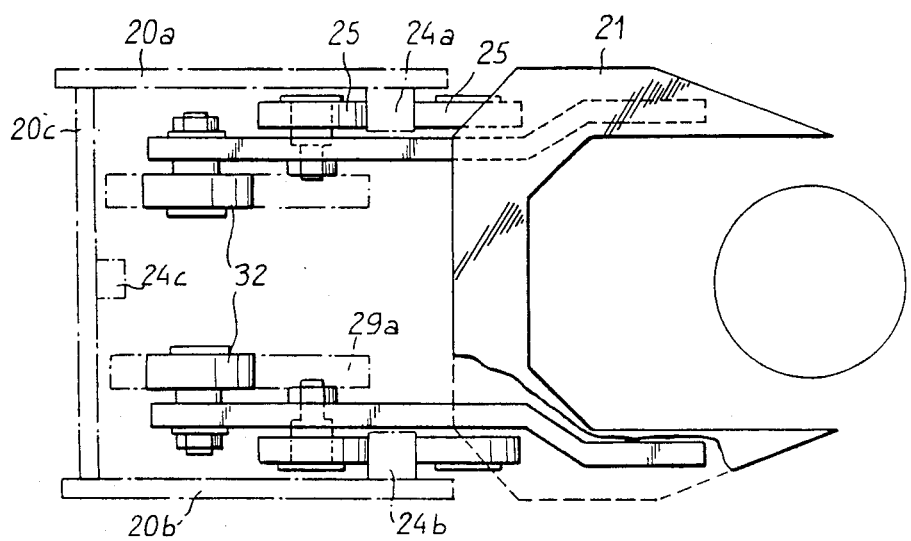

DEVICE FOR LINING A PERIPHERAL TUBE OF A STEAM GENERATOR

This is a division, of application Ser. No. 044,255, filed Apr. 30, 1987, now U.S. Pat. No. 4,827,594.

FIELD OF THE INVENTION

The invention relates to a process and a device for lining a peripheral tube of a steam generator and, in particular, of a steam generator of a pressurized water nuclear reactor.

BACKGROUND OF THE INVENTION

The steam generators of pressurized water nuclear reactors comprise a bundle of parallel tubes whose cross-section is substantially circular. These tubes are arranged in a regular pattern in the cross-sections of the bundle and are fastened at their ends in a thick tube plate, circular in shape.

The bundle tubes in which pressurized water which constitutes the reactor coolant circulates are bent into a U in their upper part, so as to form two parallel arms whose ends are crimped by roller-expanding into the tube plate. The tubes pass through the entire thickness of the tube plates, being flush with one of the faces of this plate which forms the entry face, and projecting out in relation to the other face, or exit face, to enter the region of the steam generator which receives the feed water. The part of the steam generator which is situated below the entry face receiving the pressurized water which is the reactor primary fluid, forms a water box of hemispherical shape, connected to the tube plate and separated by a transverse partition bounding a delivery compartment for the pressurized water arriving from the reactor vessel and a recovery compartment for the pressurized water which has been circulated in the tubes.

In service, the bundle tubes of the steam generator are subjected to high mechanical and thermal stresses and to the corrosive action of the primary fluid on their inner surface and of the feed water on their outer surface. Corrosion is particularly severe in the region of the tubes which is situated slightly above the exit face of the tube plate, which corresponds to the transition zone between the part which is distorted during the roller-expanding and the undistorted part of the tubes. Thus, cracks appear fairly frequently in this transition zone. The appearance of such cracks causes the entry of primary fluid, carrying radioactive products, into the feed water of the steam generator. The steam produced from this feed water is conveyed into the turbine of the nuclear reactor and circulates in many components situated outside the safety enclosure of the reactor. The steam produced may also be dumped during the atmosphere in certain stages of operation of the reactor.

It is important, for all these reasons, that the feed water should not contain any radioactive product. Any leakage through the wall of a steam generator tube must therefore be detected and remedied very promptly.

During the periods of normal stoppage for reactor maintenance, or during incidental stoppages, it is known to arrange for the defective tubes of the steam generators of the nuclear reactor to be put out of service. It is known, in particular, to insert a plug into at least one end of the defective tube and to perform the expansion of this plug to prohibit any circulation of pressurized water in the tube. The chief disadvantage of this kind of process of plugging the tubes of a steam generator is that is reduces the heat exchange surface of the steam generator in proportion to the number of tubes put out of service. In the case of a steam generator comprising a large number of defective tubes, the remaining exchange surface may become inadequate.

To extend the lifetime of steam generators, it has been proposed, therefore, to perform a lining of the part of the tubes in which cracks are present, by inserting, through the end of the tube which is flush with the tube plate, a liner which is then expanded inside the tube, near its ends. To ensure a leakproof connection between the liner and the tube to be repaired, the diametral expansion of this liner is followed by an operation of crimping, by roller-expanding the liner in its expanded regions. This operation of roller-expanding may be supplemented or replaced by a welding or brazing operation.

The lining of a steam generator tube is performed from the water box, which is accessible via a manhole, either manually or by using a complex, automatically controlled appliance.

In all cases, tube repairs which rely on lining are restricted to the middle region of the tube plate by the fact that it is necessary to use very long liners which cannot be inserted into the peripheral tubes because of the hemispherical shape of the water box which allows only a clearance which is inadequate for tubes to be inserted in the vicinity of the edges of the tube plate. Liners whose length is appreciably greater than the thickness of the tube plate must, in fact, be used, since the lower end of the liner must be placed in the tube, in its region which is flush with the entry face, and since its upper end must be situated above the transition zone in which the cracks generally appear.

In the case of steam generators of the nuclear reactors which are at present in service, the tube plate has a thickness of more than 0.50 meter and the lining liners employed have a length in the region of 0.70 m. This considerable length of the liner prevents use of the lining method in the case of the tubes situated in the peripheral rows, which represent approximately 25% of the bundle tubes. Consequently, tube plugging remains the only method which can be used in the case of the peripheral tubes, whereas it would be desirable to have the possibility of repairing these tubes by lining, to avoid reducing the exchange surface of the steam generator, after a long period of use during which many peripheral tubes have become defective.

SUMMARY OF THE INVENTION

The purpose of the invention is therefore to offer a process for lining a peripheral tube of a steam generator comprising a bundle of parallel tubes having a cross-section of substantially circular shape in which the tubes are uniformly distributed, these tubes being crimped at their ends into a circular tube plate, over the entire thickness of this plate, so as to project in relation to one of the faces of the plate, called the exit face, and to be flush with the other face, or entry face, below which the steam generator forms a water box of hemispherical shape, the lining process comprising, in a known manner, the insertion of a liner into the tube through one of its ends from the entry face of the tube plate, the diametral expansion of the liner inside the tube in at least two regions situated in the vicinity of its ends and the crimping by roller-expanding of the tube in each of its expansion regions.

To this end:

the liner has a length which is appreciably smaller than the thickness of the tube plate, the liner is inserted into the tube so that one of its ends is in a region of the tube situated inside the tube plate and away from the entry region, the other end of the liner being beyond the exit face of the tube plate, and the diametral expansion and the roller-expanding of the liner are performed in the position which the latter occupies inside the tube.

The invention also relates to an apparatus enabling the lining of the peripheral tubes of a steam generator and comprising, in particular, an appliance for the roller-expanding of a liner inside a peripheral tube.

In order that the invention may be more clearly understood, a description will now be given, by way of example, with reference to the accompanying drawings, of several embodiments of apparatus for carrying out a process for lining peripheral tubes according to the invention.

FIG. 6 is a side elevation view of the trolley of the appliance shown in FIGS. 4 and 5.

FIG. 7 is a cross-sectional view of the trolley of the appliance and of its guiding means.

FIG. 11 is a perspective view of the members for guiding the appliance shown in FIGS. 10 and 10a.

FIG. 13 is a view in section along XIII—XIII of FIG. 10a, showing the trolley of the appliance shown in FIGS. 10 and 10a.

DESCRIPTION OF PREFERRED EMBODIMENTS

Figure 1:
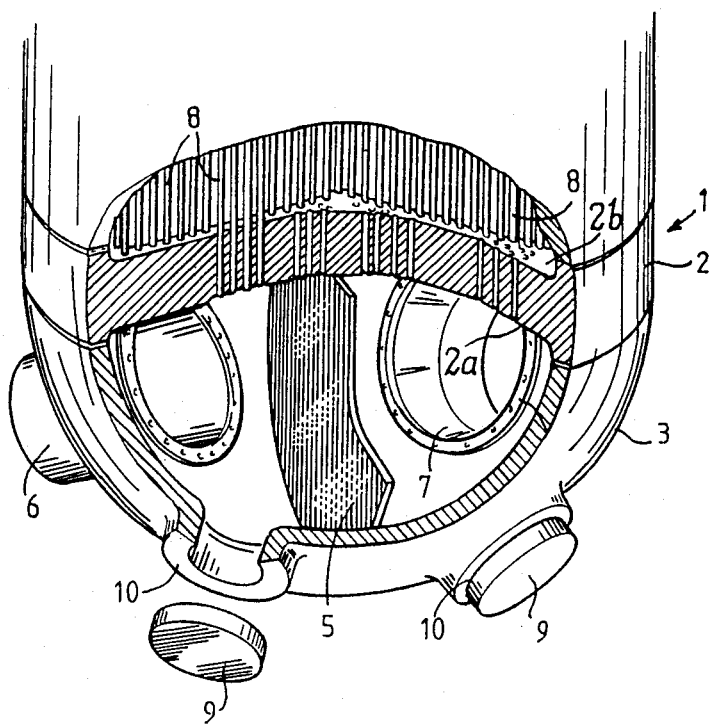
FIG. 1 is an exploded perspective view of the lower part of a steam generator of a pressurized water nuclear reactor.

FIG. 1 shows a steam generator 1 comprising a thick tube plate 2 under which is fastened the lower part of the steam generator forming a water box 3. The water box 3, of hemispherical shape, is divided into two parts by a partition 5. The pressurized water at a high temperature of the nuclear reactor enters one of the parts of the water box through a pipe 6 and then circulates in the tubes 8 of the steam generator bundle, firstly upwards and then downwards, to come out again into the second part of the water box, into which opens a pipe 7, connected to the primary circuit of the nuclear reactor, for returning the pressurized water to the reactor vessel.

The bundle tubes 8 comprise parallel arms of great length and are bent into a U in their upper portion (not shown). These tubes 8 form a bundle above the tube plate 2, whose cross-section is substantially circular. The tubes form a uniform network in the transverse regions of the bundle, which corresponds to the network of the holes passing through the tube plate, into which the ends of the tubes 8 are engaged.

Each of the arms of the bundle tubes 8 is engaged via its end into the tube plate so as to be flush with the lower face 2a of the tube plate and to project through the face 2b forming the exit face of this tube plate. The end of each of the tube arms which is engaged inside the tube plate 2 is crimped by roller-expanding inside this tube plate 2.

The bundle tubes 8 whose ends pass through the tube plate in its peripheral region are of greater length than the tubes whose ends pass through the tube plate in the more central region and will be referred to as peripheral tubes hereinafter.

Each of the parts of the water box 3 is equipped with a manhole 10 which can be closed by a blanking cover 9.

Figure 2:
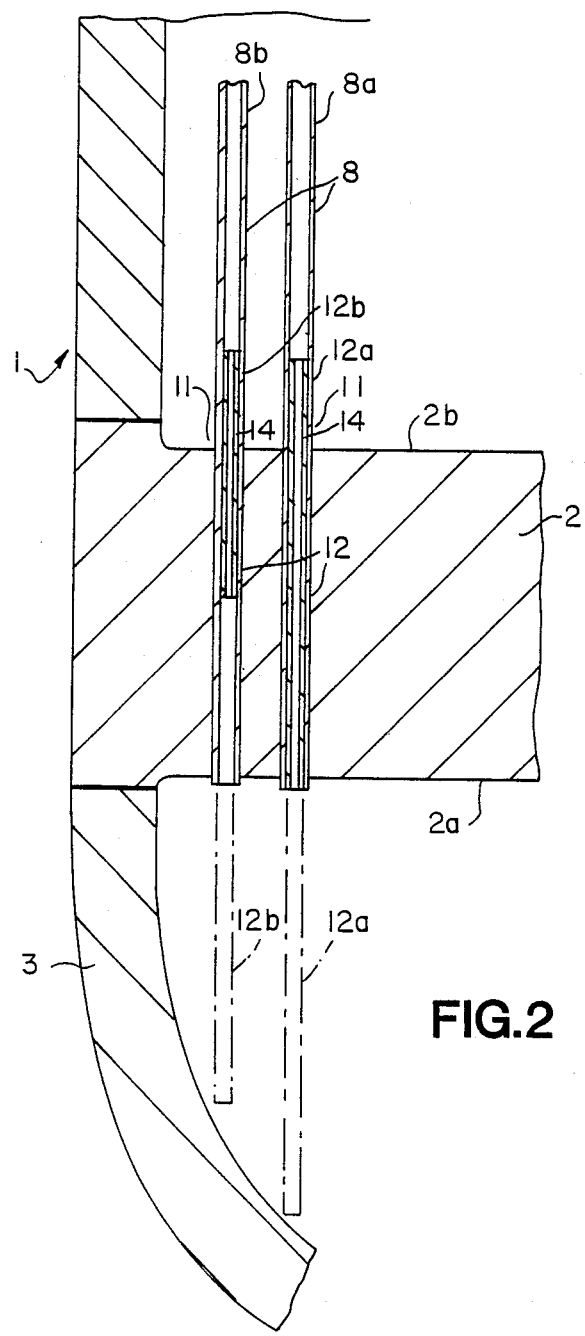
FIG. 2 is a sectional view, on a larger scale, of a part of the steam generator, showing the tube plate and two tubes passing through this plate and fitted with lining liners.

FIG. 2 shows a part of the tube plate 2, through which pass the ends of two tubes 8a and 8b, tube 8b being in a position closer to the periphery than tube 8a.

Tube 8a, situated in a more central region of the bundle than tube 8b has been lined by using a liner 12a, by a process according to the prior art.

On the other hand, tube 8b, which forms a peripheral tube has been lined by using a liner 12b, by the process according to the invention.

In both cases, the tube 8 has a crack 14 in the region 11 situated above the exit face 2b of the tube plate 2. This region 11 corresponds substantially to the transition zone between the part of the tube 8 which is distorted by roller-expanding inside the tube plate and the undistorted part of the tube. The liner 12 needs therefore to overlap the region 11 over its entire length and to be fastened in a leakproof manner, at each of its ends, onto the internal surface of the tube 8. A separation between the primary fluid circulating in the tubes 8 and the secondary fluid coming into contact with the external surface of the tubes 8 is ensured in this manner by the liner 12.

In the process according to the prior art and applied to the tubes such as tube 8a, which is not situated at the periphery of the bundle, a liner 12a of a length which is appreciably greater than the thickness of the tube plate is employed. In fact, the liner 12a, in position in the tube 8, has its lower end in the region of the lower end of the tube 8 which is flush with the entry face 2a of the tube plate, and its length is consequently equal to the thickness of the tube plate, increased by a length which is slightly greater than the length of the transition zone 11.

In the case of a tube plate of a thickness of 0.53 meter, a liner 12 of a length of 0.70 meter is thus used. A liner 12a of this kind may be presented in a vertical position below the end of the tube 8 which is flush with the entry face 2a of the tube plate, in the case of tubes which are not situated at the periphery of the bundle. In FIG. 2, below the tube 8a and in the axis of this tube, the position of the liner 12a before its entry into the tube 8a has been shown in dot-and-dash lines.

The process according to the invention is characterized firstly by the use of a liner 12b of a length which is reduced in relation to the liner used in the lining techniques according to the prior art. This liner 12b has a length which is appreciably smaller than the thickness of the tube plate in order to be capable of being inserted into the peripheral tubes. FIG. 2 shows, using dot-and-dash lines, below the tube 8b, the position of a short liner 12b, vertically below the tube 8b, in a position permitting its insertion into this tube.

In the case of a tube plate of a thickness of 0.53 meter, a liner 12b of this kind will advantageously have a length of 0.40 meter.

In its lining position inside the tube, the liner 12b has its upper end placed above the transition zone 11, with the result that its lower end is inside the tube plate 2, in a region away from the entry face 2a and preferably situated near the neutral axis of the tube plate.

Figure 3A:
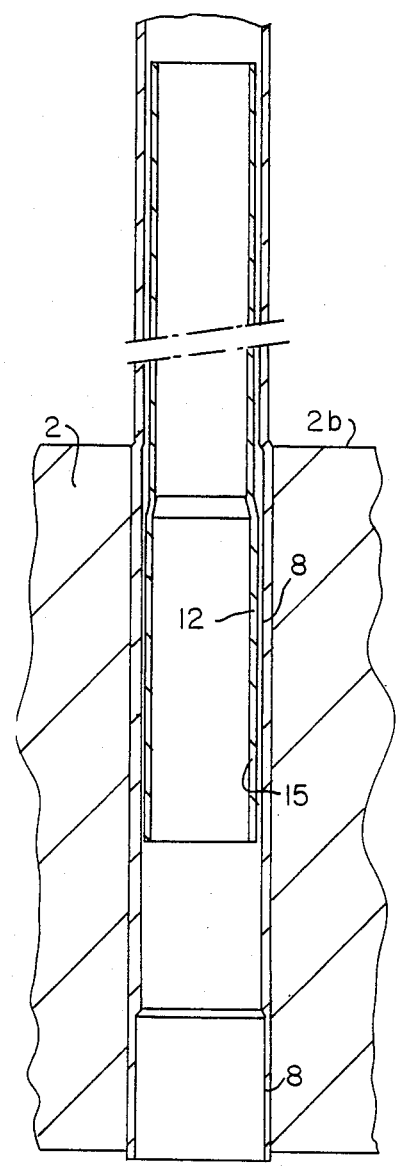
FIG. 3a is an enlarged sectional view of a steam generator tube, during an intermediate stage of a lining operation.
Figure 3B:
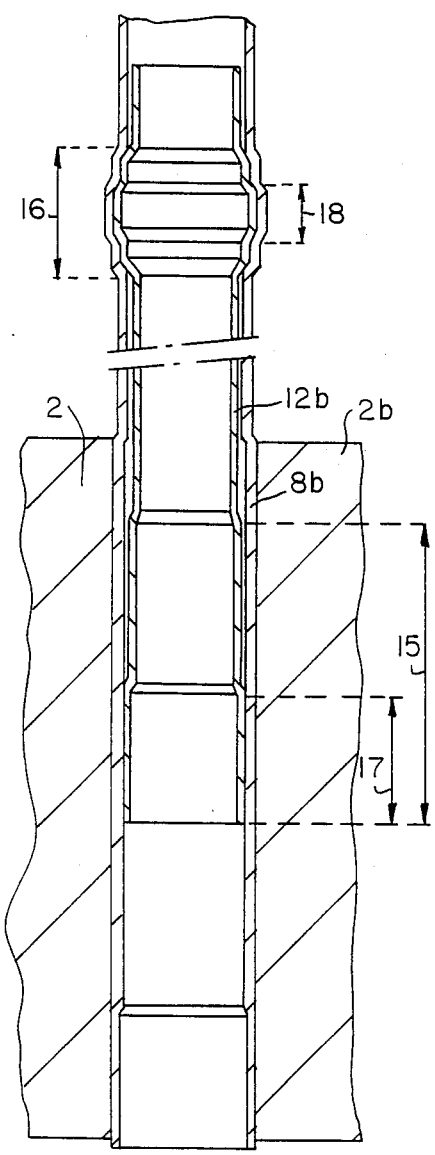
FIG. 3b is an enlarged sectional view of a steam generator tube, at the end of a lining operation.
Figure 4:
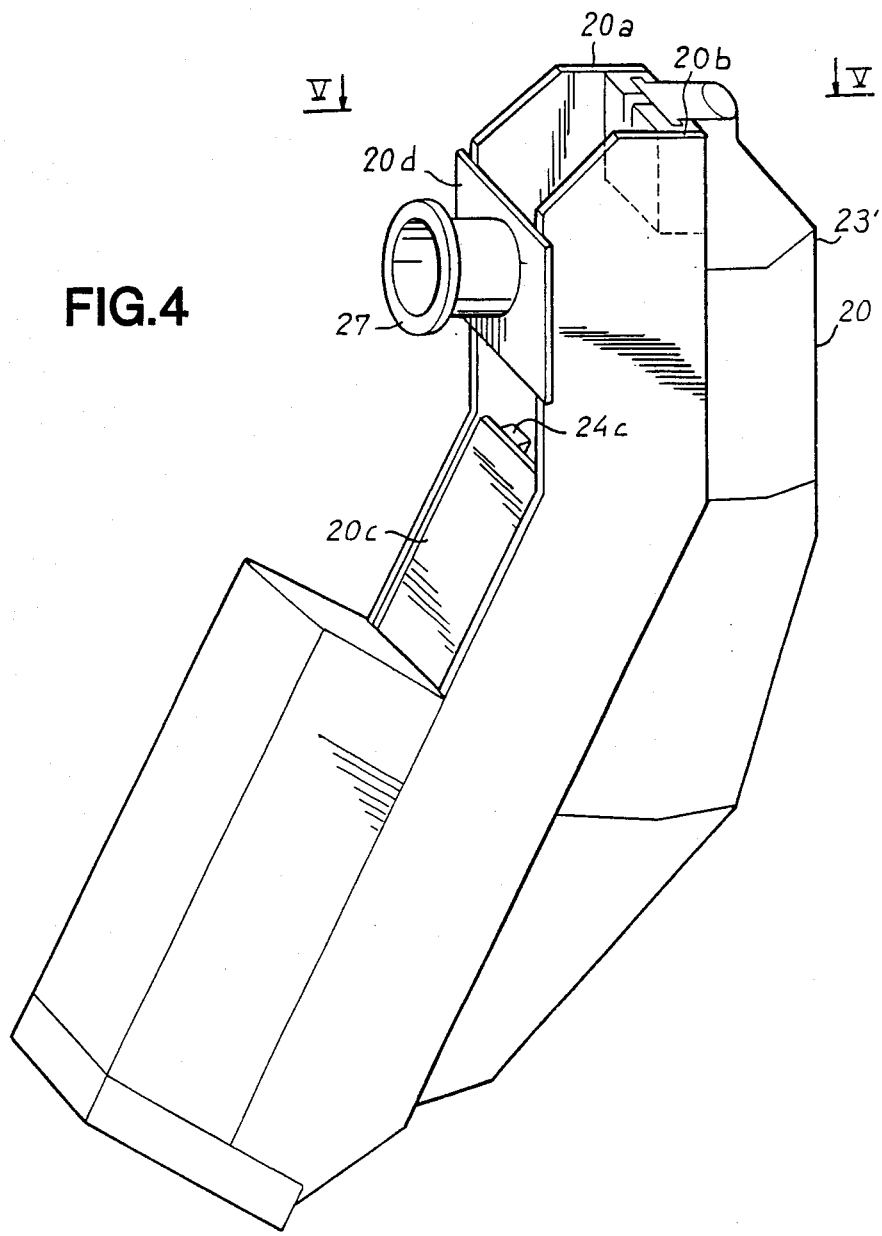
FIG. 4 is a perspective view of an appliance according to a first embodiment, making it possible to perform the roller-expanding of the lower part of a liner inside a peripheral tube of a steam generator.

FIGS. 3a and 3b show the sleeve 12b inside the peripheral tube 8b which is being lined, in an initial stage and at the end of the lining, respectively.

The lining process according to the invention, characterized by the use of short liner and by the arrangement of this liner in the tube to be lined, so that one of its ends is in a position at a distance from the entry face of the tube plate, furthermore comprises known stages of the processes of the prior art.

The liner 12 is first of all inserted into the tube 8 in the position shown in FIG. 3a. This insertion, together with the other stages of the lining process, may be performed by using the process and the appliances for remote lining which are described in a copending patent application by the present applicant, filed on the same day as the present patent application.

This process and the corresponding appliances make it possible, in particular, to insert the liner 12 at the required height into the tube 8, with highly accurate control of its position, from outside the water box.

The liner 12 inserted into the tube contains a hydraulic expander controlled from outside the water box, permitting diametral expansion of the liner 12 to be performed in two regions close to its ends. FIG. 3a shows a lower region 15 of the liner 12 which has undergone diametral expansion inside the tube 8 in its part situated inside the tube plate 2. This diametral expansion is continued until the time when the outer surface of the liner 12 comes into contact with the inner surface of the tube 8.

Diametral expansion of the liner 12 by hydraulic means is also performed in a region close to its upper end, inside the tube 8, in its part situated above the exit face 2b of the tube plate.

The liner 12 is then perfectly held in place in the tube 8, and the succeeding stage of the lining process consists in performing a roller-expanding of the liner 12 inside the tube 8, in its upper part situated above the tube plate. This roller-expanding operation may be performed by using the process and the apparatus for remote lining described in the above mentioned copending patent application. For this purpose, a roller-expanding tool is inserted into the liner 12 in a position inside the tube 8, from outside the water box, by means of a flexible tube at the end of which the roller-expanding tool is fastened and by virtue of a guiding assembly comprising, in particular, a flexible tube. The control and the drive of the rollers of the roller-expanding tool are provided from outside the water box, by means of a flexible cable running through the flexible tube.

By means of this appliance, roller-expanding is thus performed in a region 18 of the liner inside the region 16 which has previously undergone diametral expansion.

The lining must be finally supplemented by roller-expanding of the liner 12 in a region 17 situated inside the zone 15 which has previously been subjected to diametral expansion, in the lower part of the liner.

This last operation may be performed advantageously by using one of the devices according to the present invention, which will be described with reference to FIGS. 4 to 13.

It is also quite obvious that the process for lining a peripheral tube according to the invention could be implemented by using devices and processes other than those described in the above mentioned copending patent application.

The various expansion and roller-expanding operations could be carried out by an automatically controlled machine inserted into the water box of the steam generator or, alternatively, manually by an operator working from the water box and using hand appliances, insofar as the appliances could be inserted into peripheral tube and could perform a roller-expanding in a region at a distance from the entry face of the tube plate.

FIGS. 4 to 8 show a device permitting the roller-expanding of the lower part 17 of a liner 12 inserted into a peripheral tube 8 of a steam generator to be performed.

The device comprises a mechanically welded structure 20 of curved shape, inside which a trolley 21 travels, carrying a roller-expanding machine 22 connected by a flexible tube 23 to a rigid roller-expanding tool 24.

The structure 20 has two side flanges 20a and 20b connected at one of their ends by a closure plate 20c and at their other end by an added bottom 23 of curved shape. The flanges 20a and 20b carry two curved tracks 24a and 24b projecting in relation to the internal face of the flanges 20a and 20b, respectively.

On its inner face, the closure plate 20c also carries a central guiding track 24c.

The trolley 21 comprises an open U-shaped chassis and four side wheels such as 25 an 26, which can be seen in FIGS. 6 and 7, on each of its faces.

The chassis 20 of the appliance is connected by means of a fastening device 27 welded to a plate 20d integral with the flanges 20a and 20b, to the end of the arm, consisting of two articulated parts, of a manipulator machine known from the prior art, inserted into the water box of the steam generator for the lining operations and permitting an appliance fastened to the end of its arm to be presented in a position vertically below any tube 8 of the steam generator, below the entry face 2a of the tube plate.

Figure 5:
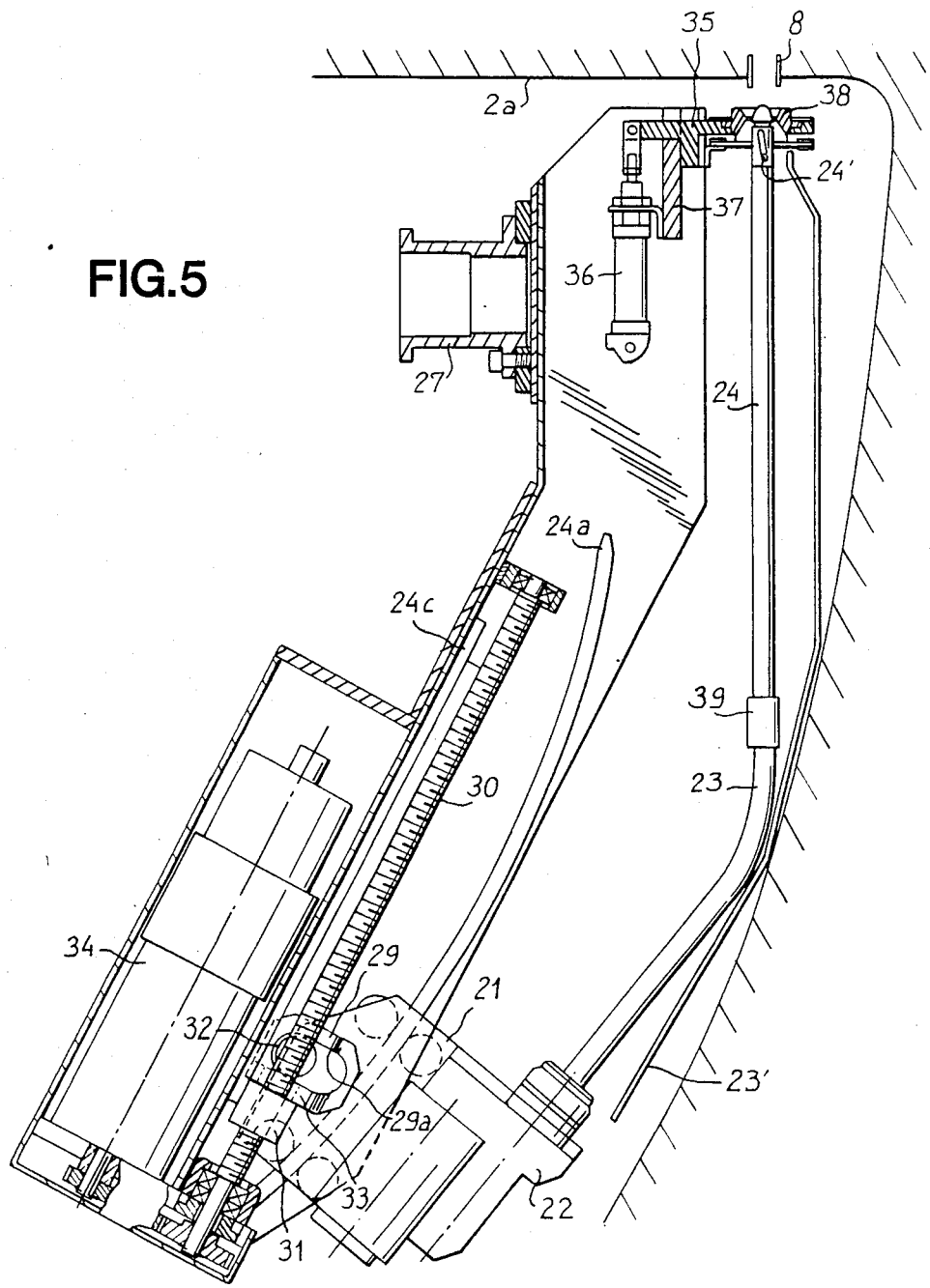
FIG. 5 is a view in section along V—V of the appliance shown in FIG. 4.
Figure 8:
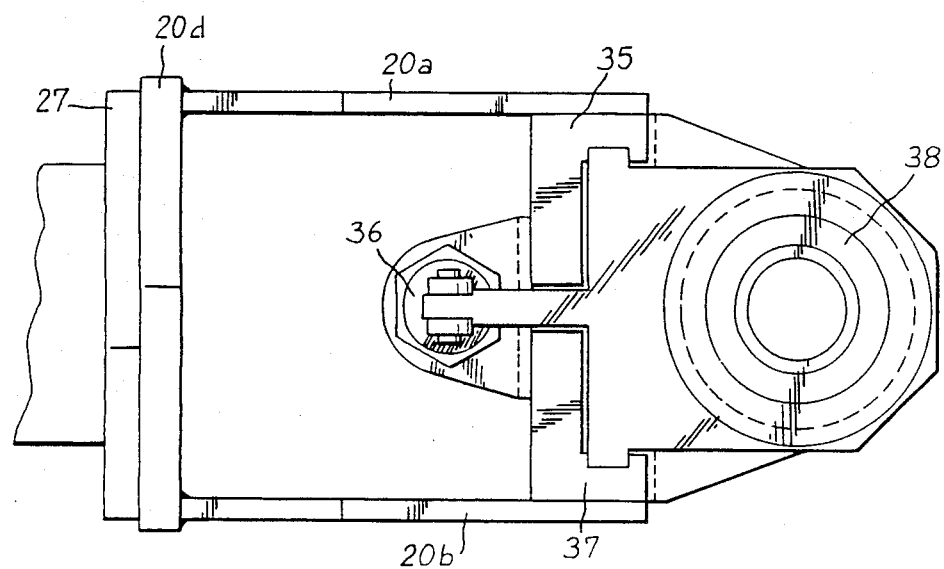
FIG. 8 is a cross-sectional view of the means for fastening the appliance to a manipulator arm arranged in the water box of the generator.

In FIG. 5, the roller-expanding appliance has been placed in a position permitting the insertion of the roller-expander 24 into a tube 8 containing a liner 12 whose diametral expansion has been carried out previously.

The trolley 21 is connected by a U-shaped coupling 29 to a screw-and-nut assembly 30–31. The two parallel sides of the coupling 29 have an oblong slot such as 29a, in which slides a centering roller 32. Two rollers 32 are mounted on the side faces opposite the trolley 21 and each is inserted into an oblong slot 29a. The third face 33 of the coupling 29 carries the nut 31 which is engaged on the screw 30. The screw 30 is rotated by a motor 34, by means of pinions.

The movement of the nut 31 along the screw 30 causes the movement of the trolley 21 which is connected to the coupling 29. During the movement, the trolley 21 rolls on the curved tracks 24a and 24b and the coupling 29 is guided by the track 24c. The oblong slots 29a make it possible to recover the diversion of the trolley 21 in a direction at right angles to the screw 30, as it moves between its low position and its high position and vice versa.

FIG. 5 shows the device enabling the device 38 for guiding and pressing the appliance to be applied onto the face 2a of the tube plate. The device 38 is mounted so that is floats on a slide 35 actuated by a jack 36 and guided by a support 37 fastened to the two flanges 20a and 20b of the chassis 20.

The added bottom 23' of the structure 20 makes it possible to guide the flexible tube 23 connecting the roller-expanding machine 22 to the rigid roller-expanding tool 24, during the installation of the roller-expanding machine fitted with its roller-expander on the trolley positioned in the lower part of the chassis 20 for this operation.

The flexible tube 23 provides a passage for a flexible cable connecting the driving means of the roller-expanding machine 22 to a needle of frusto-conical shape enabling rollers 24' of the roller-expanding tool 24 to be driven in rotation and to come out radially. In fact, the roller-expanding tool 24 comprises, in a known manner, rollers 24' mounted so that they can rotate in a cage forming a part of the body of the roller-expanding tool, and a needle which passes inside the body, between the rollers, this needle being driven in rotation and pushed against the rollers by virtue of a motor and a jack which constitute the driving arrangements of the roller-expanding machine 22.

The appliance shown in FIGS. 4 to 7 may be used both for performing the roller-expanding of the upper part of a liner 12, in its region 18 which can be seen in FIG. 3b, and for performing the roller-expanding of this liner 12 in its lower region 17, situated inside the tube plate 2.

To perform the roller-expanding of the upper part of the liner, the upper part of the appliance is fitted with the guiding device 38 whose opening is sufficient to allow the passage of the roller-expanding tool 24, of the coupling 39 connecting this tool to the flexible tube 23, and of this flexible tube 23.

In a first stage, the handling arm consisting of two articulated sections enables the appliance to be placed in the position shown in FIG. 5, precisely vertically below the peripheral tube 8 inside which has been placed a liner 12 which has subsequently undergone diametral expansion.

The trolley 21 is then caused to move upwards by means of the motor 34. The travel of the trolley 21 allows the upward movement of tool 24 and its insertion into the tube 8, until the coupling 39 comes to bear on the end of the liner 12, inside the tube 8. The trolley is then automatically caused to stop and the roller-expanding machine is switched on. The length of the rigid part of the roller-expanding tool 24 is chosen so that the roller-expanding is indeed carried out in the region 18 as is shown in FIG. 3b.

In the case of a roller-expanding operation on the lower part of the liner 12, inside the tube plate, the coupling 39 is replaced by a thrust ball-bearing, and this makes it possible to avoid the use of rotating thrust bearings situated inside the rigid roller-expander 24. The thrust ball-bearing interacts with the floatingly mounted guiding device 38 to stop the roller-expanding tool 24 in a low position, when the trolley 21 moves upwards; the roller-expanding rollers 24' are then in the region 17, shown in FIG. 3b.

In both cases, the travels of the trolley 21 and the application of the roller-expanding machine are remotely controlled from outside the water box.

The appliance shown in FIGS. 4 to 8 makes it possible to perform the roller-expanding in the upper part of the liner outside the tube plate 2 as well as in the lower part of the liner inside the tube plate. In the first case, the stresses involved during the roller-expanding are relatively low, whereas they are much greater in the second case. However, the transmission of the driving force between the roller-expanding machine 22 and the roller-expanding tool 24 is effected by a short length of flexible cable passing inside the flexible tube 23. A torque and a thrust which are relatively high can therefore be transmitted by this short length of flexible cable. In addition, during the roller-expanding operations, the length of flexible tube 23 is in a substantially rectilinear configuration, both in the case of the roller-expanding of the upper part and in the case of the roller-expanding of the lower part of the liner.

Figure 9:
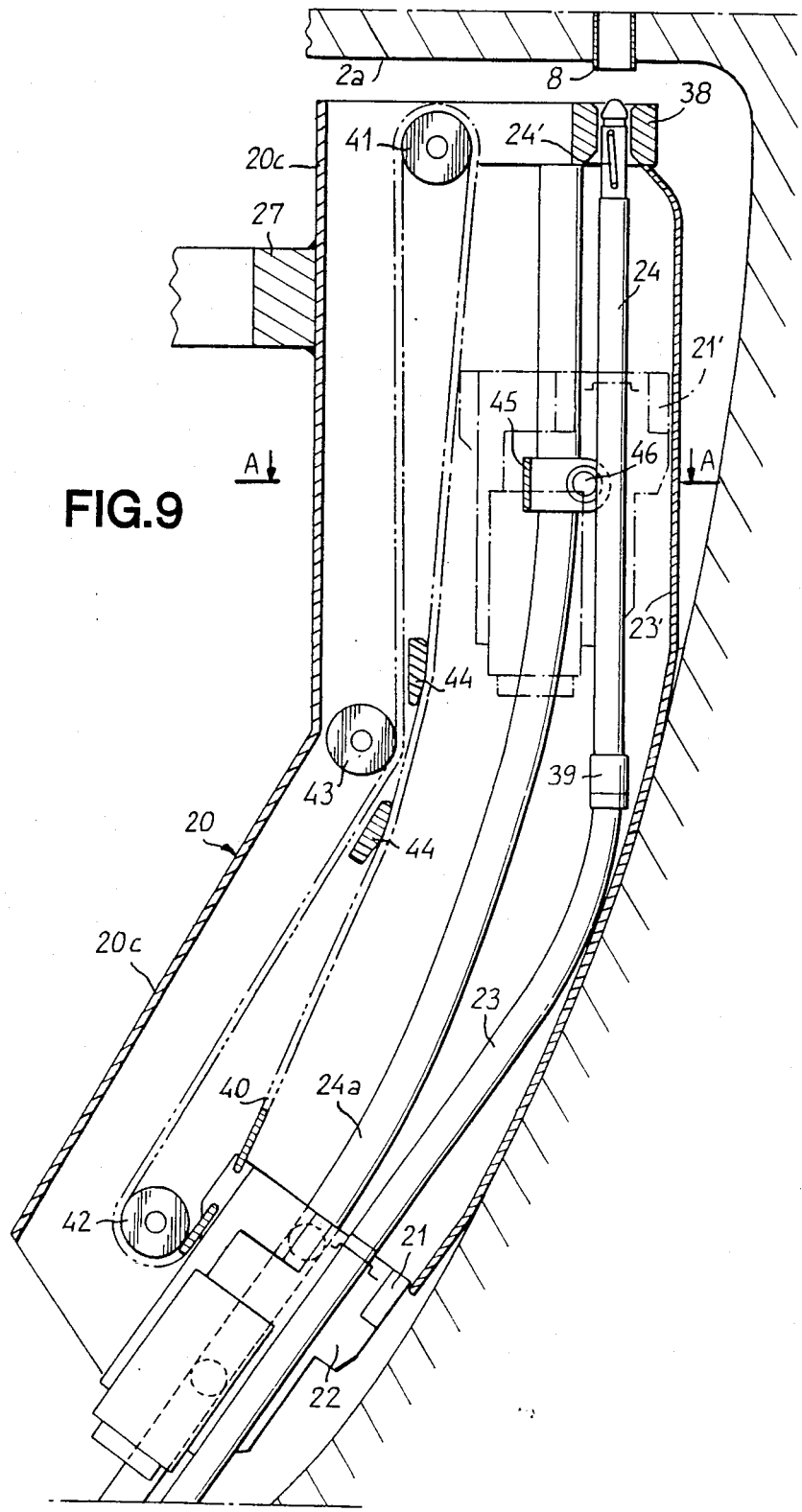
FIG. 9 is a vertical section view of an appliance according to a second embodiment permitting the roller-expanding of the lower part of a liner inside a steam generator tube to be performed.
Figure 9A:
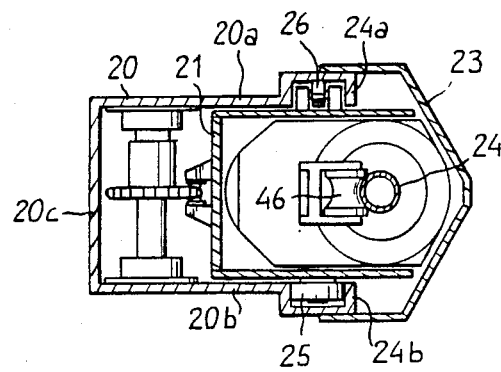
FIG. 9a is a view in section along A—A of FIG. 9.

FIGS. 9 and 9a show a second embodiment of an appliance enabling the roller-expanding of a liner to be performed. This embodiment differs from the preceding one only in the use of a drive assembly using pinions and a chain instead of a screw-and-nut assembly for causing the trolley to travel in either direction. The corresponding components in, on the one hand, FIGS. 9 and 9a and, on the other hand, 4 to 8 bear the same references.

In this embodiment, the curved tracks 24a and 24b consist of a hollow part of the flanges 22a and 22b, respectively, and the side wheels 25 and 26 of the trolley 21 are guided inside these tracks. Wheels 25 provide lengthwise guidance and wheels 26 transverse guidance.

The trolley 21 is connected to an endless chain 40 whose run is defined by a driving pulley 41, a return pulley 42, a deflecting pulley 43 and guiding skids. In view of the flexibility of the chain 40, this run make it possible to follow the runs of the curved tracks 24a and 24b which ensures the guidance of the trolley 21.

The trolley 21 may thus be driven inside the structure 20 of the appliance, between a low position, at the entrance of the structure 20, and shown in solid lines, and a high position 21' shown in dash dotted. The driving pulley 41 is, in fact, connected to a motor allowing it to be rotated in either direction to move the trolley upwards or downwards.

The structure 20 also carries, by means of a support 45, a pulley 46 with a horizontal axis permitting the roller-expanding tool 24 and the flexible tube 23 to be guided during the travels of the trolley 21 driving the roller-expanding machine 22.

FIGS. 10 to 13 show a third embodiment of an appliance which makes it possible to perform the roller-expanding of the lower part of a lining liner for a peripheral tube of a steam generator. This appliance is fastened at the end of the arm 50 of a handling machine inserted into the water box 3 of a steam generator and comprising an arm with two articulated sections enabling an appliance to be placed vertically below any tube of the steam generator.

This appliance comprises a structure 51, a trolley 52 capable of travelling in the structure and carrying the roller-expanding machine 53 comprising a rigid roller-expanding tool 54, at the end of which the roller-expanding rollers 55 are fitted.

Figure 11:
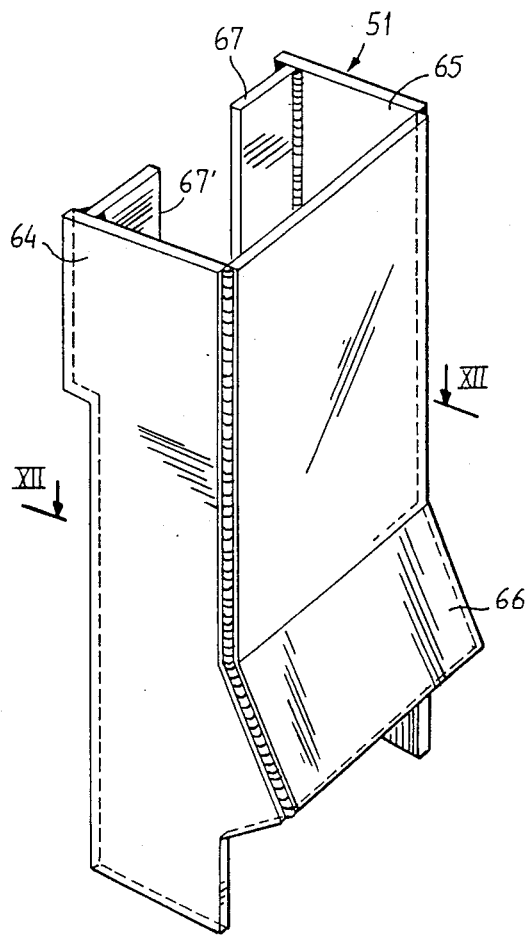
Figure 12:
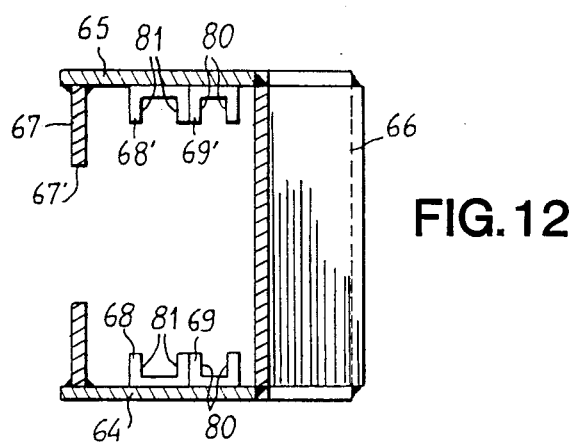
FIG. 12 is a cross-sectional view of the guiding members shown in FIG. 11.

Fastened to the upper part of the guiding structure 51, which will be described in greater detail with reference to FIGS. 11 and 12, is a support 56 which carries at its end a guiding component 58 and on which a screw 57 of great length is fitted, articulated around a horizontal pivot 59.

The roller-expanding machine 53 is integrally attached to the trolley 52 by means of a support 60 which also carries a driving nut 61 engaged on the screw 57 and an electric motor 62 enabling the nut 61 to be driven by means of a set of pinions.

The rotation of the nut 61 by the motor 62 allows the trolley 52 to travel along the guiding means of the structure 51.

As can be seen in FIGS. 11 and 12, the guiding structure 51 comprises two vertical side faces 64 and 65, a front face 66 which is partly vertical and partly inclined and a rear face 67 which is partly open at 67' to allow the passage of the connecting part of the trolley support 60.

Each of the side faces 64 and 65 carries two slides 68, 68' and 69, 69' for lateral guidance. These slides consist of U-beams with parallel faces. They are vertical and parallel in the high part of the structure, and inclined at different angles $\alpha$ and $\beta$ in the lower part of the structure (FIG. 10a).

Figure 13:
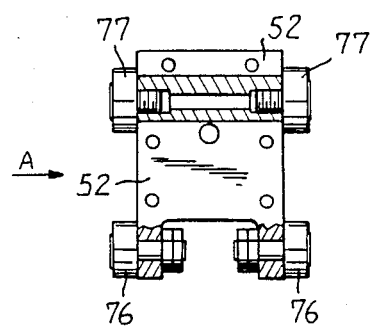
Figure 13A:
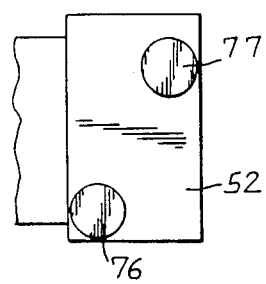
FIG. 13a is a view along A of FIG. 13.

The trolley 52, which can be seen in FIG. 13, comprises two sets of wheels 76 and 77, in different parallel vertical planes, separated by a distance which is equal to the separation of the slides 68 and 69.

Figure 10:
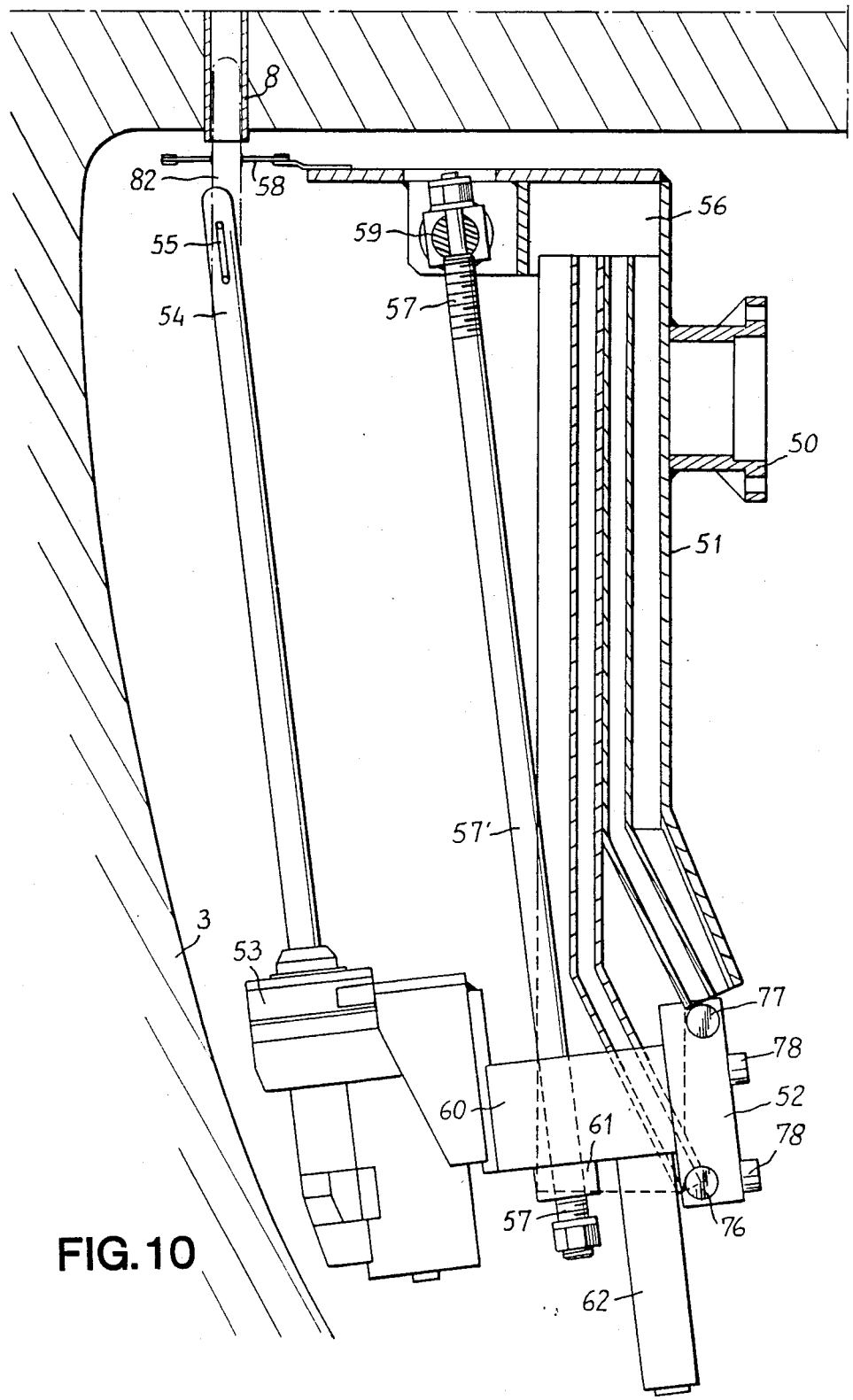
FIGS. 10 and 10a are views in partial vertical section of an appliance according to a third embodiment and in two working positions, permitting the roller-expanding of the lower part of a liner to be performed, inside a peripheral tube of a steam generator.
Figure 10A:
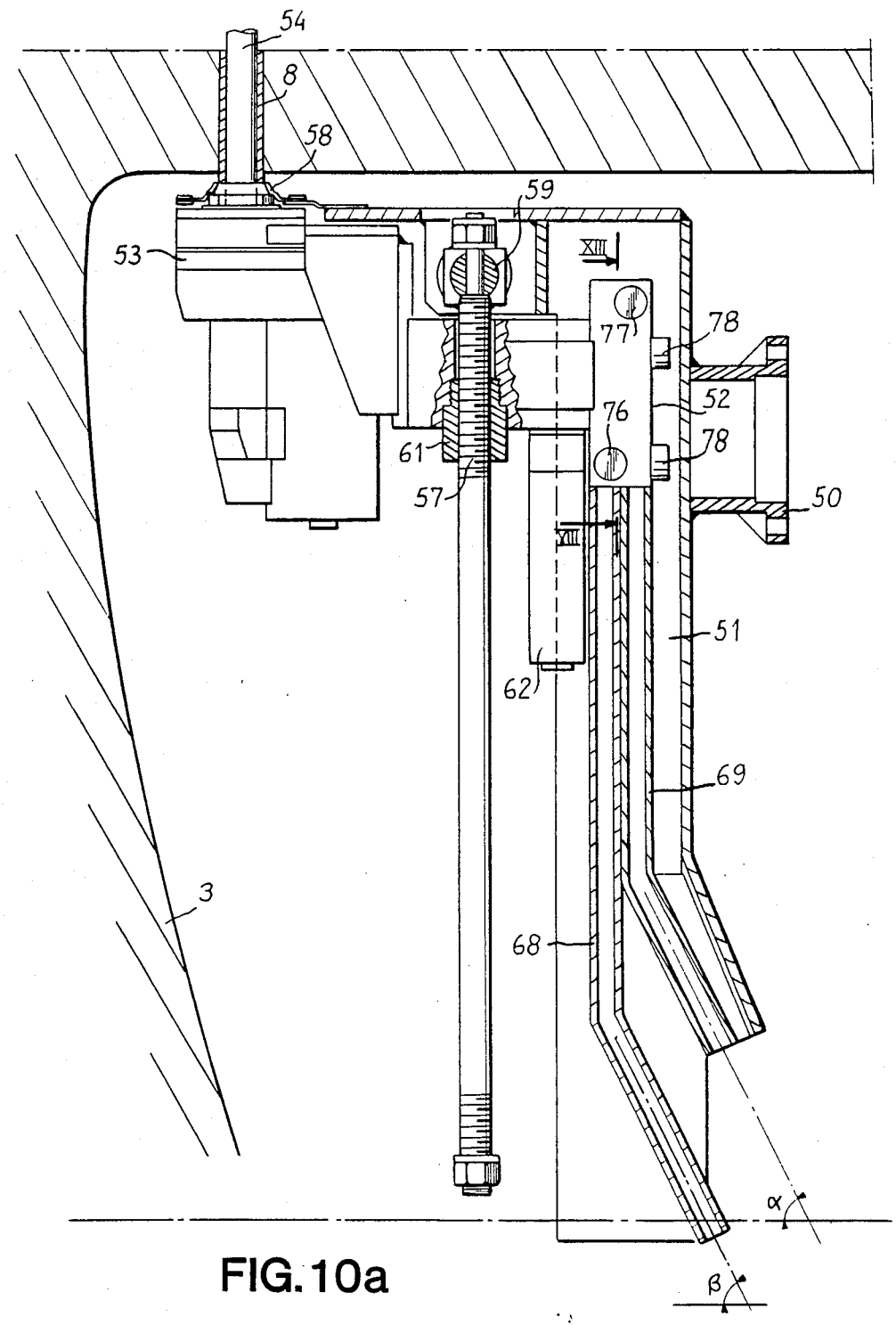

The trolley 52 additionally comprises four wheels for lengthwise guidance 78, which can be seen in FIGS. 10 and 10a. These wheels 78 are mounted along an axis which is perpendicular to the axis of the wheels 76 and 77.

FIG. 10a shows the trolley 52 and the roller-expanding tool in their high position.

When the trolley 52 is engaged into the guiding device 51 (FIG. 10), the wheels 76 and 77 engage in the inclined tracks 80 and 81 arranged between the inner parallel faces of the slides 69, 69' and 68, 68' towards the outside of the guiding device. The wheels 76 engage in the inclined tracks 80 and 81 are arranged between the inner parallel faces of the slides 68, 68'. These tracks 80 and 81 can be seen in FIG. 12, in particular.

Under the effect of the weight of the roller-expanding machine 53 and of its support 60, the entire device, suspended from the screw 57 and mounted so that it articulates at its upper part, tilts towards the left and is held in an inclined position which enables it to adapt to the curvature of the water box 3, by virtue of the slope of the guiding ramps 80 and 81. The screw 57 then occupies an inclined position 57' (FIG. 10).

The upward movement of the trolley 52, of the support 60 and of the appliance 53 is produced by causing the motor 62 to rotate, driving the nut 61.

The entire device is continuously guided by the inclined ramps 80 and 81 so that the roller-expanding machine 53 and its tool 54 can travel in a combined motion of vertical translation and rotation around a horizontal axis. During the upward travel of the trolley 52, the rigid appliance 54 of the roller-expanding machine is gradually brought into vertical alignment with the axis 82 of the tube 8 in which roller-expanding is to be performed. This alignment of the tool 54 with the axis 82 is produced when the trolley 52 reaches the entrance of the vertical parts of the ramps 80 and 81 provided between the slides 69 and 69' and 68 and 68', respectively.

The screw 57 occupies the vertical position shown in FIG. 10a.

The movement of the trolley 52 and of the roller-expanding machine 53, then continues in the vertical direction, the appliance 54 passing firstly into the centering device 58 and then into the tube 8, until the roller-expanding machine 53 reaches its high position abutting on the centering device 58.

The upper part of the roller-expanding tool 54 comprising the rollers 55 is then perfectly positioned to perform the roller-expanding operation in the lower expanded part of the liner 12 inside the tube 8.

The means driving the roller-expanding machine 53 are then switched on from outside the water box to perform the required roller-expanding. The torque and the thrust are transmitted by the driving means of the roller-expanding machine 53 to the end of the roller-expanding tool comprising the rollers 55, by means of a short rigid rod. Torques and a considerable thrust can thus be transmitted, and strong forces can thus be applied to the roller-expanding rollers 55.

It can be seen, therefore, that both the devices shown in FIGS. 4 to 8 and 9 and 9a and the device shown in FIGS. 10 to 13 make it possible, on the one hand, to insert a roller-expanding tool automatically and securely into a peripheral tube of a steam generator, despite the curvature of the inner surface of the water box and, on the other hand, to exert considerable forces on the rollers of the roller-expanding tool.

These devices are thus especially useful in the case of the roller-expanding of the lower part of the liner, which requires considerable forces.

However, the devices shown in FIGS. 4 to 8 and 9 and 9a can also be used to perform the roller-expanding of the upper part of the liner, outside the tube plate, an operation which requires the use of lesser forces.

The advantages of the process and apparatus according to the invention are that it permits the lining of the peripheral tubes of the bundle of a steam generator to be performed when these tubes are defective, and thus it increases considerably the scope for intervention to carry out repairs without a reduction in the exchange surface of the steam generator.

. By means of the process and apparatus according to the invention, it becomes possible to perform the lining of most of the peripheral tubes of the bundle of a steam generator, only a very small percentage of the tubes which are situated at the outermost periphery of the bundle being incapable of being lined even by using a short liner and an adapted appliance according to the invention.

It is possible to use short liners of a length which differs slightly from that indicated above, so long as this length is in a range of between 40 and 80% of the thickness of the tube plate.

The various lining operations may be carried out manually, automatically or automatically. However, the expansion of the liner and the roller-expanding of its upper part will advantageously be performed by using the process and the device for remote lining which is the subject of applicant's above-mentioned copending patent application.

It is also quite obvious that the roller-expanding of the lower part of the liner may be performed by manual or automatic means other than those which have been described, so long as these means may be inserted into the peripheral tubes of the bundle.

The position of the short liner inside the tube to be lined may vary, depending on the length of the liner in relation to the thickness of the plate, on the length of the transition zone of the tube to be lined and on the position of the cracked region. However, in the lining process according to the invention, the lower end of the liner will preferably be placed in a region situated approximately in the middle part of the tube plate, i.e., at approximately equal distances from the entry face 2a and the exit face 2b of this tube plate.

The process and apparatus according to the invention can be applied to the lining of not only steam generators of pressurized water nuclear reactors, but of any steam generator comprising a water box of hemispherical shape situated on one side of the tube plate and a tube bundle of substantially circular cross-section, in which the tubes are uniformly distributed.

What is claimed is:

1. Device for lining a peripheral tube of a steam generator comprising a bundle of parallel tubes having a cross-section of substantially circular shape in which the tubes (8) are uniformly distributed, said tubes being crimped at ends thereof into a circular tube plate (2) having first and second faces over the entire thickness of said tube plate (2) so as to project in relation to said first face (2b) of said tube plate, called the exit face, and to be flush with said second face (2a) of said tube plate, called entry face, below which said steam generator forms a water box (3) of hemispherical shape, by means of a lining process comprising insertion of a liner (12) into the tube (8) through one of its ends, from the entry face (2a) of the tube plate (2), diametral expansion of the liner (12) inside the tube (8), in at least two regions (15, 16) situated adjacent said ends, and crimping by roller-expanding of the tube in each of the expansion regions, said device comprising, in addition to means for performing the insertion and the diametral expansion of the liner (12) and to a manipulator device comprising an arm (40) making it possible to place an appliance in any position vertically below a tube (8) of the bundle, below the entry face (2a) of the tube plate, an assembly for handling and for roller-expanding making it possible to insert a roller-expanding tool (24) into a peripheral tube (8), said assembly comprising (a) a curved structure (20) consisting of two flat side flanges (20a, 20b), and a curved bottom (23') connected to each of said flanges (20a, 20b);

(b) a curved guiding slide (24a, 24b) associated with each of said flanges (20a, 20b);

(c) a trolley (21) mounted for movement in said curved structure (20) and guided along a curved trajectory substantially along an inner wall of said water box (3), by means of wheels (25, 26) interacting with said guiding slides (24a, 24b) of said curved structure (20);

(d) means (20, 31, 40, 41) for driving said trolley (21) along said curved slides (24a, 24b), in either direction;

(e) a roller-expanding device having driving means (22) carried by said trolley (21) and comprising a rigid roller-expanding tool (24) connected to said driving means carried by said trolley, by a flexible tube (23) inside which is placed a flexible cable for driving said roller-expanding tool (24), by means of said driving means (22); and (f) a device (38) for guiding said roller-expanding tool (24) on leaving said curved structure (20).

2. Lining device according to claim 1, wherein said rigid roller-expanding tool (24) is connected to said flexible tube (23) by means of a coupling (39) having a diameter such that it forms an abutment for stopping said appliance (24) and said trolley (21) on the end of said liner (12) which is situated inside said tube plate (2).

3. Lining device according to claim 1, wherein said rigid roller-expanding tool (24) is connected to said flexible tube (23) by means of a coupling (39) forming a rotary abutment determining the stopping of said appliance (24) and of said trolley (21) when it comes to bear on said guiding device (38) on leaving said curved structure (20).

4. Lining device according to claim 1, wherein said driving means (30, 31) consists of a screw-and-nut assembly comprising a nut (31) connected to said trolley (21) by means of a fastening (29) allowing said trolley to move in at least one direction perpendicular to a screw (30) of said screw-and-nut assembly arranged along the length of said curved slides (24a, 24b).

5. Lining device according to claim 1, wherein said driving means (40, 41) consists of a chain (40) having a run substantially corresponding to the run of said curved slides (24a, 24b), and a driving pinion (41) meshing with said chain, and said trolley is connected to said chain (40) by a fastening (29).

6. Device according to claim 5, further comprising at least one pulley for guiding (46) said roller-expanding tool (24) during movements of said trolley (21).

* * * * *